(12) United States Patent
Cho et al.

(10) Patent No.: US 10,698,515 B2
(45) Date of Patent: *Jun. 30, 2020

(54) TOUCH DISPLAY DEVICE HAVING A GATE OFF MODULATION VOLTAGE AND METHOD OF DRIVING THE SAME

(71) Applicant: LG Display Co., Ltd., Seoul (KR)

(72) Inventors: Soon-Dong Cho, Gumi-si (KR); Hoon Jang, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/183,075

(22) Filed: Nov. 7, 2018

(65) Prior Publication Data

US 2019/0073075 A1    Mar. 7, 2019

Related U.S. Application Data

(63) Continuation of application No. 15/390,157, filed on Dec. 23, 2016, now Pat. No. 10,152,157.

(30) Foreign Application Priority Data

Aug. 31, 2016  (KR) .......................  10-2016-0111936

(51) Int. Cl.
| | | |
|---|---|---|
| G06F 3/041 | (2006.01) | |
| G09G 3/36 | (2006.01) | |
| G06F 3/044 | (2006.01) | |
| G09G 3/20 | (2006.01) | |

(52) U.S. Cl.
CPC ............ *G06F 3/0412* (2013.01); *G06F 3/044* (2013.01); *G06F 3/0416* (2013.01); *G09G 3/2096* (2013.01); *G09G 3/3648* (2013.01); *G09G 3/3674* (2013.01); *G09G 3/3685* (2013.01); *G09G 2310/027* (2013.01); *G09G 2310/0291* (2013.01); *G09G 2310/0297* (2013.01); *G09G 2310/08* (2013.01); *G09G 2354/00* (2013.01); *G09G 2370/10* (2013.01)

(58) Field of Classification Search
CPC ..................................................... G06F 3/0412
USPC ....................................................... 345/174
See application file for complete search history.

(56) References Cited

U.S. PATENT DOCUMENTS

| | | | |
|---|---|---|---|
| 9,024,913 B1 | 5/2015 | Jung et al. | |
| 9,298,307 B2 | 3/2016 | Chen et al. | |
| 9,405,411 B2 | 8/2016 | Kim et al. | |
| 9,459,717 B2 | 10/2016 | Lee et al. | |
| 10,152,157 B2 * | 12/2018 | Cho | ............... G09G 3/3648 |
| 2010/0123673 A1 | 5/2010 | Nam | |

(Continued)

FOREIGN PATENT DOCUMENTS

| | | |
|---|---|---|
| CN | 102929460 A | 2/2013 |
| CN | 103777801 A | 5/2014 |

(Continued)

*Primary Examiner* — Long D Pham
(74) *Attorney, Agent, or Firm* — Seed Intellectual Property Law Group LLP

(57) ABSTRACT

A touch display device for simplifying a signal transmission pattern and a circuit structure is disclosed. A timing controller supplies display information to a touch and data driver through a data transmission line during a data writing period and supplies touch voltage information to the touch and data driver through the data transmission line during a touch driving period.

20 Claims, 6 Drawing Sheets

(56) References Cited

U.S. PATENT DOCUMENTS

| | | | |
|---|---|---|---|
| 2012/0092322 A1 | 4/2012 | Enjou et al. | |
| 2012/0218482 A1* | 8/2012 | Hwang | G06F 3/044 349/12 |
| 2014/0285466 A1* | 9/2014 | Hayashi | G06F 3/044 345/174 |
| 2015/0370401 A1 | 12/2015 | Mizuhashi et al. | |
| 2018/0024677 A1* | 1/2018 | Kim | G06F 3/0412 345/173 |

FOREIGN PATENT DOCUMENTS

| | | |
|---|---|---|
| CN | 105022523 A | 11/2015 |
| CN | 105260067 A | 1/2016 |

\* cited by examiner

TOUCH DISPLAY DEVICE HAVING A GATE OFF MODULATION VOLTAGE AND METHOD OF DRIVING THE SAME

This application is a continuation of U.S. patent application Ser. No. 15/390,157, filed Dec. 23, 2016, which claims the benefit of Korean Patent Application No. 10-2016-0111936, filed on Aug. 31, 2016, which applications are hereby incorporated by reference in their entireties for all purposes as if fully set forth herein.

BACKGROUND

Technical Field

The present disclosure relates to a touch display device and a method of driving the same, for simplifying a signal transmission pattern and a circuit structure.

Description of the Related Art

A touch sensor for receiving information via touch on a display screen has been extensively applied in various displays such as a lap top computer, a monitor, and home appliance as well as a portable information device such as a smartphone.

Touch technology applied to a display is classified into add-on type technology and in-cell type technology according to a position of a touch sensor. The add-on type technology is an external installation method of attaching a touch screen panel onto a display panel, and the in-cell type technology may be an internal installation method of installing a touch electrode in a display panel to integrate the display panel and a touch screen.

The in-cell type technology has been further advanced for a slimmed display device and developed to an advanced in-cell touch (hereinafter, AIT) display device using a divided common electrode of a liquid crystal display as a touch electrode.

The AIT display device may time-divide each frame period into a data writing period for writing image data in pixels and a touch driving period for applying a touch driving signal to touch electrodes, sensing whether touch occurs and driving a touch display panel.

Recently, the AIT display device has used a load free driving (LFD) method of applying modulation signals with the same phase as a touch driving signal to data lines and gate lines to reduce load of the touch electrodes and to improve touch sensing sensitivity while applying the touch driving signal to a touch electrode during a touch driving period.

For load free driving, a touch power integrated circuit (TPIC) generates a common voltage, and a common high voltage and common low voltage of the touch driving signal and supplies the generated voltages to a plurality of data ICs through separate transmission lines.

Accordingly, a printed circuit board (PCB) including a TPIC, a timing controller, etc., installed therein and connected to a data IC has a problem in that transmission patterns are increased for load free driving and, thus, costs are increased and electromagnetic interference (EMI) is increased during a touch driving period and reliability of a transmitted signal is degraded.

In addition, there is a need to simplify a circuit structure of a TPIC for reducing costs.

BRIEF SUMMARY

Accordingly, the present disclosure is directed to a touch display device and a method of driving the same that substantially obviates one or more problems due to limitations and disadvantages of the related art.

An object of the present disclosure is to provide a touch display device and a method of driving the same, for transmitting touch voltage information to a combined touch and data driver (which may be referred to herein as a touch/data driver) through a data transmission line by a timing controller to reduce transmission patterns of a PCB and EMI.

Another object of the present disclosure is to provide a touch display device and a method of driving the same, for simplifying a circuit structure of a touch power integrated circuit (TPIC).

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the various structures particularly pointed out in the written description and claims hereof as well as the appended drawings.

To achieve these objects and other advantages and in accordance with the purpose of the disclosure, as embodied and broadly described herein, a timing controller may supply display information to the touch/data driver through a data transmission line during a data writing period and supply touch voltage information to the touch/data driver through the data transmission line during a touch driving period.

In another aspect of the present disclosure, a touch/data driver may drive data lines and the touch electrodes of the panel, and may be utilized for reading out capacitance change of the touch electrodes to output touch sensing information.

The touch/data driver may generate a touch driving signal using the touch voltage information and supply the touch driving signal to the touch electrodes and the data lines.

In another aspect of the present disclosure, a touch power circuit may supply a gate off modulation voltage to the gate driver during the data writing period, and may generate the gate off modulation voltage and supplies the gate off modulation voltage to the gate driver such that the gate driver supplies a gate off modulation voltage with the same phase and amplitude as the touch driving signal to the gate lines during the touch driving period. The gate driver may supply a gate off modulation voltage to gate lines during a touch driving period.

The timing controller may convert the display information into a transmission packet embedded in clock and supply the transmission packet to the touch/data driver through the data transmission line during the data writing period indicated by a touch synchronization signal, and may convert the touch voltage information into a transmission packet embedded in the clock and supply the transmission packet to the touch/data driver through the data transmission line during the touch driving period indicated by the touch synchronization signal.

It is to be understood that both the foregoing general description and the following detailed description of the present disclosure are exemplary and explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principles of the disclosure. In the drawings.

DETAILED DESCRIPTION

Reference will now be made in detail to the preferred embodiments of the present disclosure, examples of which are illustrated in the accompanying drawings.

Figure 1:
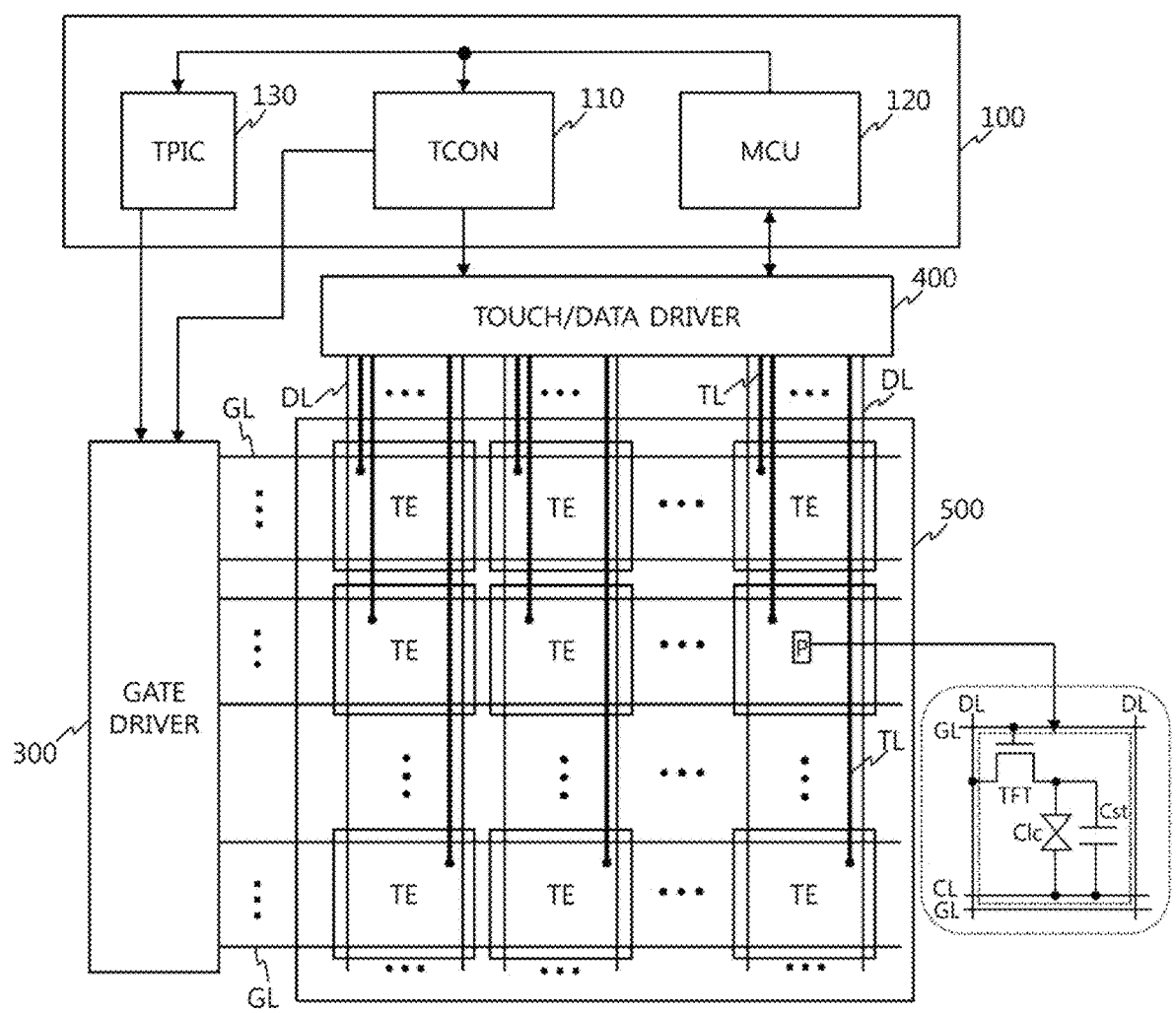
FIG. 1 is a block diagram illustrating a structure of a touch display device according to one or more embodiments of the present disclosure.
Figure 2:
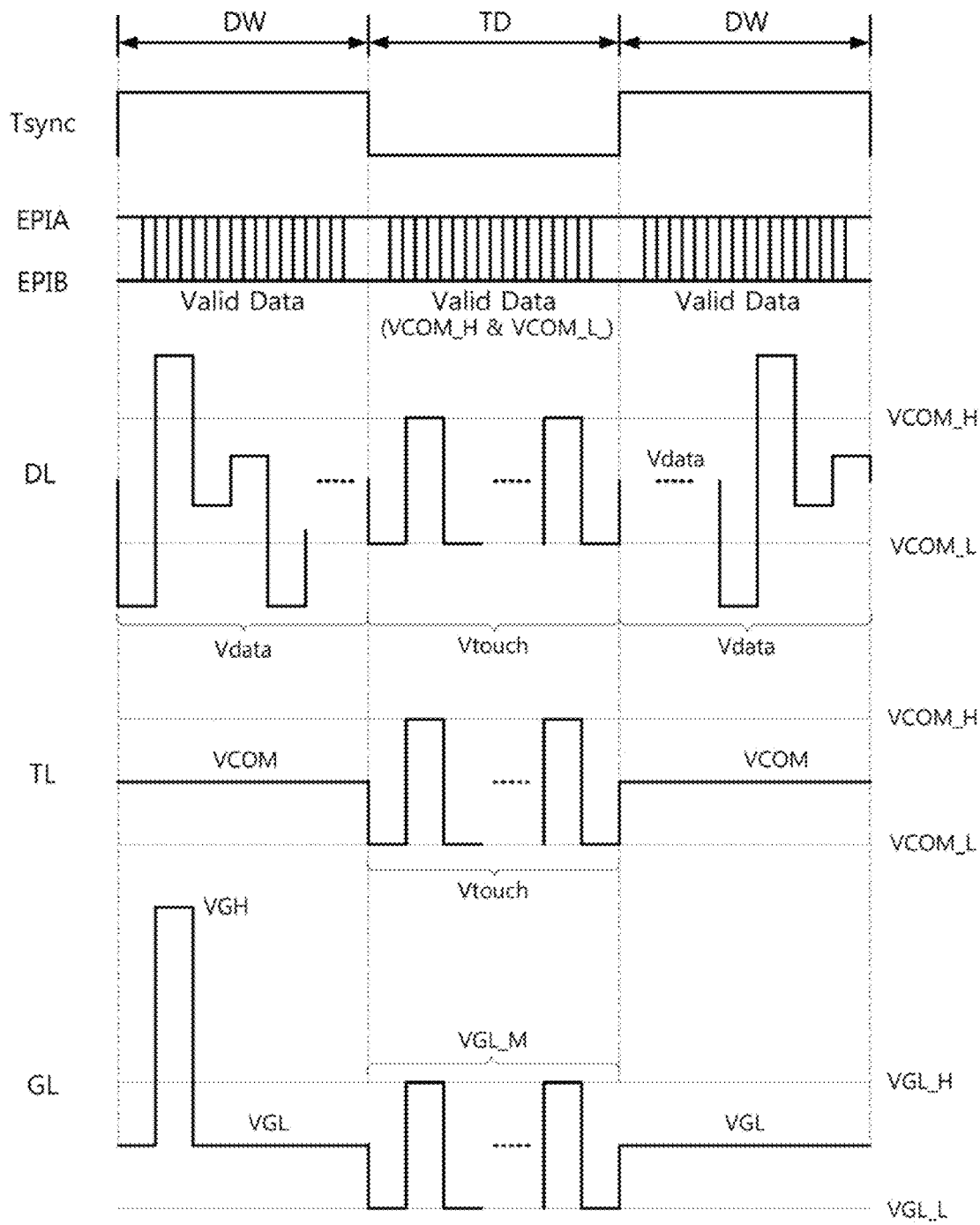
FIG. 2 is a driving waveform diagram of a touch display device according to embodiments of the present disclosure.
Figure 3:
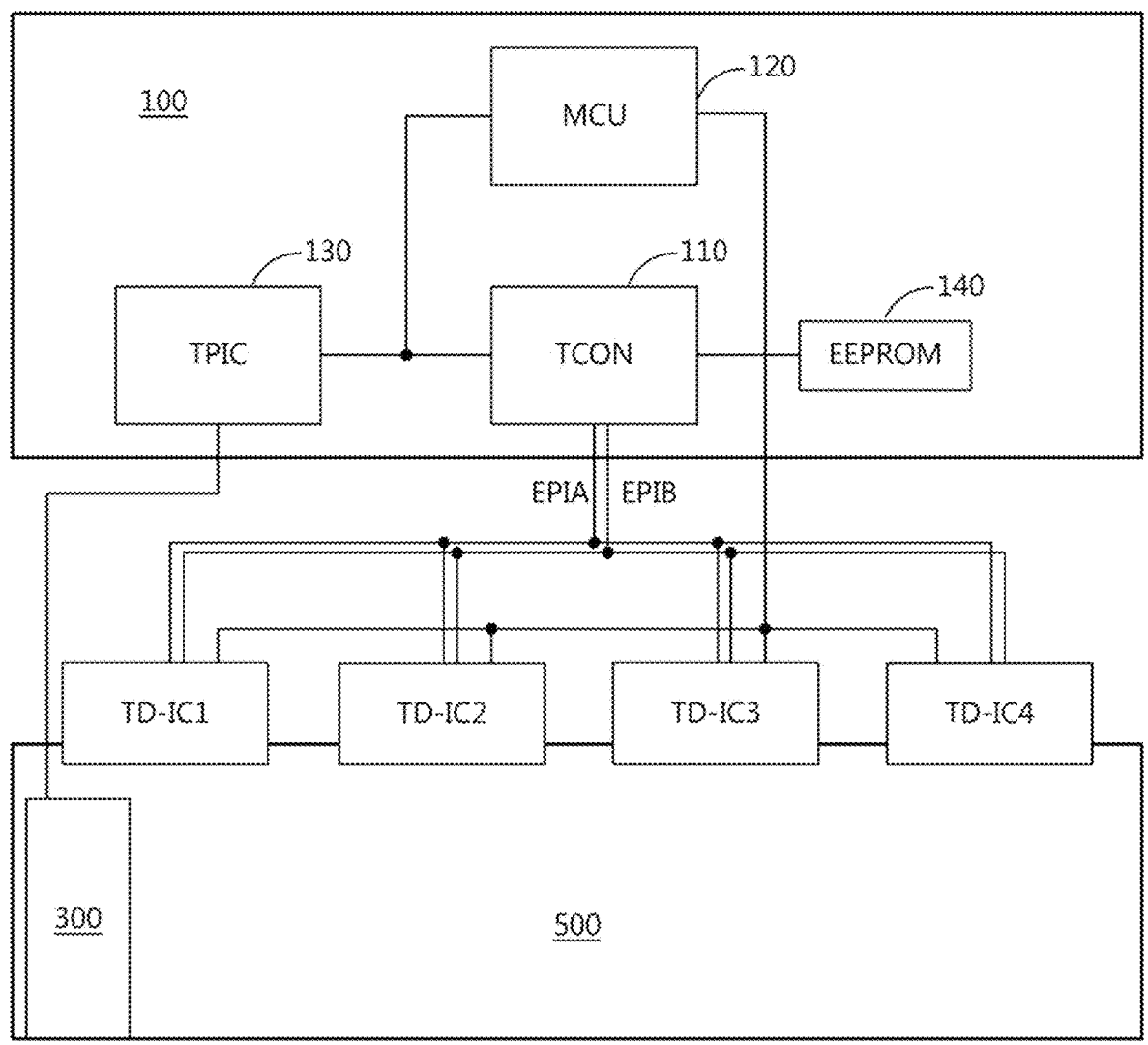
FIG. 3 is a schematic diagram illustrating a connection structure between a plurality of touch/data integrated circuits (ICs) and a printed circuit board (PCB) in a touch display device according to embodiments of the present disclosure.

FIG. 1 is a block diagram illustrating a structure of a touch display device according to one or more embodiments of the present disclosure. FIG. 2 is a driving waveform diagram of a touch display device according to embodiments of the present disclosure. FIG. 3 is a schematic diagram illustrating a connection structure between a plurality of touch/data integrated circuits (ICs) and a printed circuit board (PCB) in a touch display device according to embodiments of the present disclosure.

Referring to FIGS. 1 and 3, the touch display device may include a timing controller (TCON) 110, a micro controller unit (MCU) 120, a touch power IC (TPIC) 130, a gate driver 300, a touch and data (hereinafter, touch/data) driver 400, a panel 500, a power supply (not shown), and so on. The TCON 110, the MCU 120, the TPIC 130, the power supply, and various other features or components may be installed in a PCB 100.

As illustrated in FIG. 3, the touch/data driver 400 may include a plurality of touch/data ICs TD-IC1 to TD-IC4. Each of the touch/data ICs TD-IC1 to TD-IC4 may be installed on a circuit film such as a tape carrier package (TCP), a chip on film (COF) and a flexible printed circuit (FPC) and attached to the panel 500 and the PCB 100 via a tape automatic bonding (TAB) method or may be installed on the panel 500 via a chip on glass (COG) method and connected to the PCB 100 through an FPC.

The gate driver 300 may include at least one gate IC, may be installed on a circuit film such as TCP, COF, and FPC, and may be attached to the panel 500 via a TAB method or may be installed on the panel 500 via a COG method. On the other hand, the gate driver 300 may be formed on a thin film transistor substrate along with a thin film transistor included in a pixel array of the panel 500 to constitute a gate in panel (GIP)-type device installed in a non-display region of the panel 500, as illustrated in FIG. 3.

The panel 500 may have a touch and display function, display an image through a pixel array in which pixels P are arranged in a matrix form, and sense whether a touch occurs using a common electrode and touch electrode TE via a capacitance method. The panel 500 may display an image through a pixel array in which the pixels P are arranged in a matrix form. The pixel array may include R/G/B (red, green, blue) pixels or W/R/G/B (white, red, green, blue) pixels.

The panel 500 may be an organic light emitting diode display panel or a liquid crystal display panel, and embodiments of the present disclosure are described in terms of an example of a liquid crystal display panel. A capacitance touch sensing method may use any one of a mutual capacitance touch sensing method and a self-capacitance touch sensing method, and embodiments of the present disclosure are described in terms of an example of self-capacitance touch sensing method.

Each of the pixels P of the panel 500 may include a thin film transistor TFT connected to a gate line GL and a data line DL, a liquid crystal capacitor Clc connected to the thin film transistor TFT and a common line CL, and a storage capacitor Cst. The liquid crystal capacitor Clc may be charged with a difference voltage between a data signal supplied to a pixel electrode through the thin film transistor TFT and a common voltage VCOM applied to the common electrode and touch electrode TE and may drive liquid crystals according to the charged voltage to adjust light transmittance. The storage capacitor Cst may stably maintain the voltage charged in the liquid crystal capacitor Clc.

The panel 500 may include a plurality of touch electrode groups included in the pixel array and each of the plurality of touch electrode groups may include a plurality of touch electrodes TE arranged in a direction of the data line DL, and a plurality of touch lines TL that are separately connected to the plurality of touch electrodes TE and connected to the touch/data driver 400. The plurality of touch electrodes TE may be formed by dividing the common electrode formed in the pixel array and each of the touch electrodes TE may be formed with a predetermined size including a plurality of pixels in consideration of a size of a touch point.

A power supply (not shown) may generate and supply various driving voltages utilized by the touch display device. The power supply may generate and output various driving voltages for driving various circuit components of the touch display device, (e.g., the TCON 110, the MCU 120, the TPIC 130, the gate driver 300, the touch/data driver 400, and the panel 500) using an input voltage supplied from an external source. For example, the power supply may generate and output digital driving voltages VCC and GND applied to the TCON 110, the MCU 120, the TPIC 130, and so on, a common voltage Vcom applied to the touch/data driver 400, an analog driving voltage VDD, a gate on voltage VGH and gate off voltage VGL applied to the gate driver 300, and so on using the input voltage. The gate off voltage VGL may be applied to the gate driver 300 through the TPIC 130.

The MCU 120 may generate a touch synchronization signal Tsync, supply the signal to the TCON 110 and the TPIC 130, generate various timing control signals utilized for touch driving and sensing, and supply the signals to the touch/data driver 400 and the TPIC 130. The MCU 120 may receive touch sensing information from the touch/data driver 400, signal-process the touch sensing information, determine whether a touch occurs, detect a touch region, generate a coordination of the touch region, and supply the coordination to a host system.

The touch synchronization signal Tsync may indicate a data writing period DW and a touch driving period TD that are obtained by time-dividing each frame period (e.g., with each frame period corresponding with a period of the Tsync signal), as illustrated in FIG. 2. The data writing period DW may refer to a period in which image data is written in pixels of the panel 500. The touch driving period TD may refer to a period in which a touch driving signal Vtouch is applied to the touch electrodes TE of the panel 500 for sensing whether a touch occurs.

The TPIC 130 may select the gate off voltage VGL and supply the gate off voltage VGL to the gate driver 300 during the data writing period DW and may generate a gate off modulation voltage VGL_M with the same phase and amplitude as a touch driving signal Vtouch and supply the gate off modulation voltage VGL_M to the gate driver 300 during the touch driving period TD, in response to the touch synchronization signal Tsync and a timing control signal which are supplied from the MCU 120. The TPIC 130 may alternately select and output a gate off high voltage VGL_H and a gate off low voltage VGL_L under control of pulse width modulation (PWM) (hereinafter, PWM_TX) supplied from the MCU 120 so as to supply the gate off modulation voltage VGL_M to the gate driver 300 during the touch driving period TD. The TPIC 130 may receive and use the gate off voltage VGL from a power supply and the gate off high voltage VGL_H and the gate off low voltage VGL_L may be used by converting a digital value stored in an internal memory into an analog voltage.

The TCON 110 may receive image data and timing signals from a host system (not shown). Timing signals may include a dot clock, a data enable signal, a vertical synchronization signal, and a horizontal synchronization signal. The vertical synchronization signal and the horizontal synchronization signal may be generated by counting a data enable signal and thus may be omitted.

The TCON 110 may generate gate control signals for controlling driving timing of the gate driver 300 using timing signals received from a host system and supply the gate control signals to the gate driver 300. For example, the gate control signals may include a gate output enable signal, etc., for controlling output timing of a gate start pulse, a gate shift clock, and a scan pulse, for controlling a scan operation of a shift register.

The TCON 110 may generate data control signals for controlling operation timing of the touch/data driver 400 using timing signals received from a host system and supply the data control signals to the touch/data driver 400. For example, data control signals may include a source start pulse and a source sampling clock, used to control latch timing of data, a source output enable signal for controlling output timing of data, a polarity control signal for controlling polarity of a data signal, and so on.

The TCON 110 may receive the touch synchronization signal Tsync from the MCU 120. On the other hand, the TCON 110 may generate the touch synchronization signal Tsync and supply the touch synchronization signal Tsync to the MCU 120 and the TPIC 130.

The TCON 110 may perform image processing such as image quality control on image data received from a host system, store the image data in an internal memory, and supply display information including the image data and data control signals to the touch/data driver 400 during the data writing period DW indicated by the touch synchronization signal Tsync. The TCON 110 may supply displaying information including image data, control information, and so on to the touch/data driver 400 through data transmission lines EPIA and EPIB (refer to FIG. 3) during the data writing period DW. The TCON 110 may read image data from a memory at a higher speed than a writing speed during the data writing period DW and supply the image data to the touch/data driver 400 and may also control operation timing of the gate driver 300 and the touch/data driver 400 to write a data voltage in a pixel array of the panel 500 during the data writing period DW.

The TCON 110 may supply touch voltage data VCOM_H and VCOM_L of the touch driving signal Vtouch to the touch/data driver 400 through the data transmission lines EPIA and EPIB (refer to FIG. 3) during the touch driving period TD indicated by the touch synchronization signal Tsync. Accordingly, a separate transmission line for transmitting the touch voltage data VCOM_H and VCOM_L may not be required between the TCON 110 and the touch/data driver 400.

The touch voltage data VCOM_H and VCOM_L may be pre-stored in an electrically erasable and programmable read only memory (EEPROM) 140 illustrated in FIG. 3 and upon being powered on, the TCON 110 may read the touch voltage data VCOM_H and VCOM_L along with various information items of another display from the EEPROM 140, store the read information in an internal register and, then, read and use the touch voltage data VCOM_H and VCOM_L from a register during the touch driving period TD.

The TCON 110 and the touch/data driver 400 may transmit and receive data using any one of various interfaces. For example, the TCON 110 may use an embedded point-to-point interface (EPI) for converting various control information and image data into a serial form including clock and transmitting the converted data via a point-to-point method in a packet unit. An EPI packet may include a clock training pattern for clock locking of the touch/data driver 400, an align training pattern, a control packet including clock and control information in a serial form, a data packet including clock and pixel data in a serial form, and so on and may further include a packet including the touch voltage data VCOM_H and VCOM_L.

The TCON 110 may convert display information including control information, image data, and so on into an EPI packet including clock using an EPI protocol and transmit the EPI packet to the touch/data driver 400 via a pair of transmission lines EPIA and EPIB during the data writing period DW. The TCON 110 may convert the touch voltage data VCOM_H and VCOM_L into an EPI packet including clock and transmit the EPI packet including clock to the touch/data driver 400 through the pair of transmission lines EPIA and EPIB during the touch driving period TD.

The EPI packet including display information may include a control packet including clock and control information in a serial form, a data packet including clock and any one of color data RGB or WRGB in a serial form, and so on and may further include a clock training pattern for an internal clock locking of the touch/data ICs TD-IC1 to TD-IC4. The control information may include a plurality of data control signals that are utilized to drive each of the touch/data ICs TD-IC1 to TD-IC4.

The touch/data driver 400 may recover display information such as clock, control information, and image data from the EPI packet transmitted from the TCON 110, convert the image data into an analog data signal Vdata, and supply the analog data signal Vdata to data lines DL of the panel 500 during the data writing period DW. The touch/data driver 400 may apply the common voltage Vcom supplied from a power supply to the touch electrodes TE through touch lines TL during the data writing period DW such that the touch electrodes TE function as a common electrode during the data writing period DW.

The touch/data driver 400 may recover the touch voltage data VCOM_H and VCOM_L from the EPI packet transmitted from the TCON 110 and convert the touch voltage data VCOM_H and VCOM_L into analog voltages VCOM_H and VCOM_L during the touch driving period TD. The touch/data driver 400 may switch outputs of a touch high voltage VCOM_H and a touch low voltage VCOM_L under control of PWM_TX supplied from the MCU 120 to generate the touch driving signal Vtouch in a pulse form in which the touch high voltage VCOM_H and the touch low voltage VCOM_L are alternated. The touch/data driver 400 may simultaneously supply the touch driving signal Vtouch to data lines DL and touch lines TL of the panel 500 during the touch driving period TD.

The touch/data driver 400 may supply the touch driving signal Vtouch to the touch electrodes TE through the touch lines TL and then read out a signal fed back through a separate touch line TL from each of the touch electrodes TE during the touch driving period TD. The touch/data driver 400 may differentially amplify the touch driving signal Vtouch and the read out signal with respect to each touch electrode TE, sense self-capacitance change (signal delay) of each touch electrode TE due to touch to generate sensing data, and supply the sensing data to the MCU 120. To this end, the touch/data driver 400 may include a readout circuit.

The gate driver 300 may receive a gate control signal from the TCON 110, generate a scan pulse according to the gate control signal and, sequentially, drive gate lines GL during the data writing period DW. The gate driver 300 may supply a scan pulse of the gate on voltage VGH to the gate line GL for each scan period during the data writing period DW and supply the gate off voltage VGL supplied from the TPIC 130 during the remaining data writing period DW in which other gate lines GL are driven.

The gate driver 300 may supply the gate off modulation voltage VGL_M that is supplied instead of the gate off voltage VGL from the TPIC 130 to the gate lines GL during the touch driving period TD.

Referring to FIG. 3, the TCON 110 may be connected to each of the touch/data ICs TD-IC1 to TD-IC4 through a separate pair of transmission lines EPIA and EPIB and may transmit an EPI packet to each of the touch/data ICs TD-IC1 to TD-IC4 through the separate pair of transmission lines EPIA and EPIB. The EPI packet may transmit display information during the data writing period DW and transmit the touch voltage data VCOM_H and VCOM_L, and so on during the touch driving period TD.

The TPIC 130 may supply the gate off voltage VGL to the gate driver 300 during the data writing period DW and generate the gate off modulation voltage VGL_M and supply the gate off modulation voltage VGL_M to the gate driver 300 during the touch driving period TD. Unlike conventional techniques, the TPIC 130 does not generate a touch driving signal Vtouch; VCOM, VCOM_H, and VCOM_L and, thus, a circuit block for generating a touch driving signal may be omitted so as to simplify a circuit structure, and a transmission line between the TPIC 130 and the touch/data driver 400 may also be omitted, thereby simplifying a transmission pattern of the PCB 100.

The touch/data ICs TD-IC1 to TD-IC4 may recover display information from the EPI packet transmitted from the TCON 110, convert image data into an analog signal Vdata, supply the analog signal Vdata to data lines DL of the panel 500, and also supply the common voltage Vcom supplied from a power supply to the touch electrodes TE through the touch lines TL, during the data writing period DW. Accordingly, the panel 500 may write the data signal Vdata for image display in pixels P according to a scan order of the gate driver 300.

The touch/data ICs TD-IC1 to TD-IC4 may recover the touch voltage data VCOM_H and VCOM_L from the EPI packet transmitted from the TCON 110, convert the touch voltage data VCOM_H and VCOM_L into the analog voltages VCOM_H and VCOM_L, switch the analog voltages VCOM_H and VCOM_L according to a control signal of the MCU 120, and supply the touch driving signal Vtouch to all the data lines DL and the touch lines TL of the panel 500 during the touch driving period TD. Simultaneously, the gate driver 300 may supply the gate off modulation voltage VGL_M supplied from the TPIC 130 to all the gate lines GL.

During the touch driving period TD, the touch driving signal Vtouch supplied to the data lines DL and the touch electrodes TE and the gate off modulation voltage VGL_M supplied to the gate lines GL may have the same phase and amplitude as illustrated in FIG. 2. Accordingly, the panel 500 may perform load-free driving for minimizing resistive-capacitive (RC) load of the touch electrodes TE to reduce signal distortion due to the RC load during the touch driving period TD, thereby enhancing touch sensing sensitivity.

Figure 4:
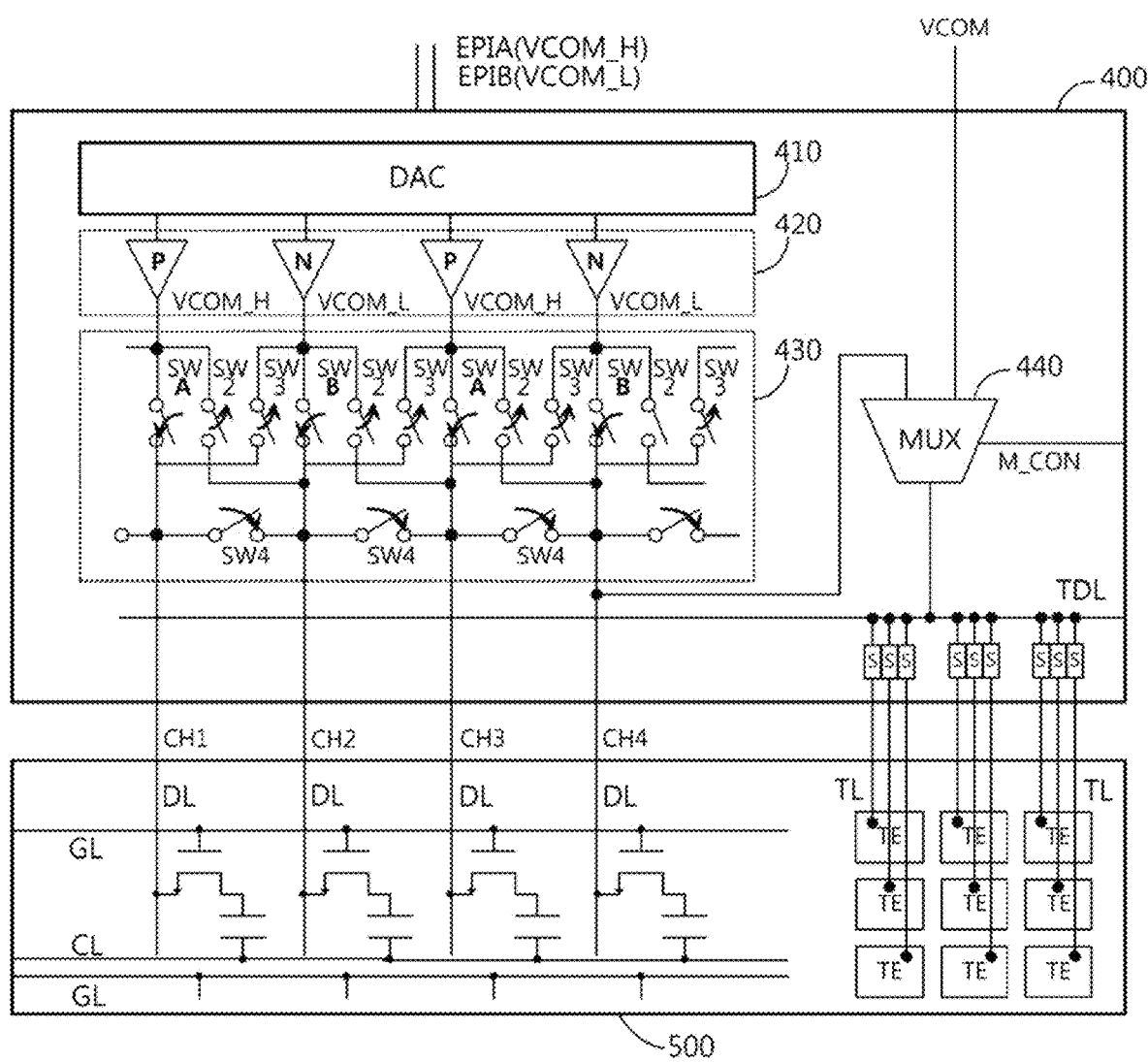
FIG. 4 is a circuit diagram of some components of a touch/data driver in terms of an output according to embodiments of the present disclosure.
Figure 5:
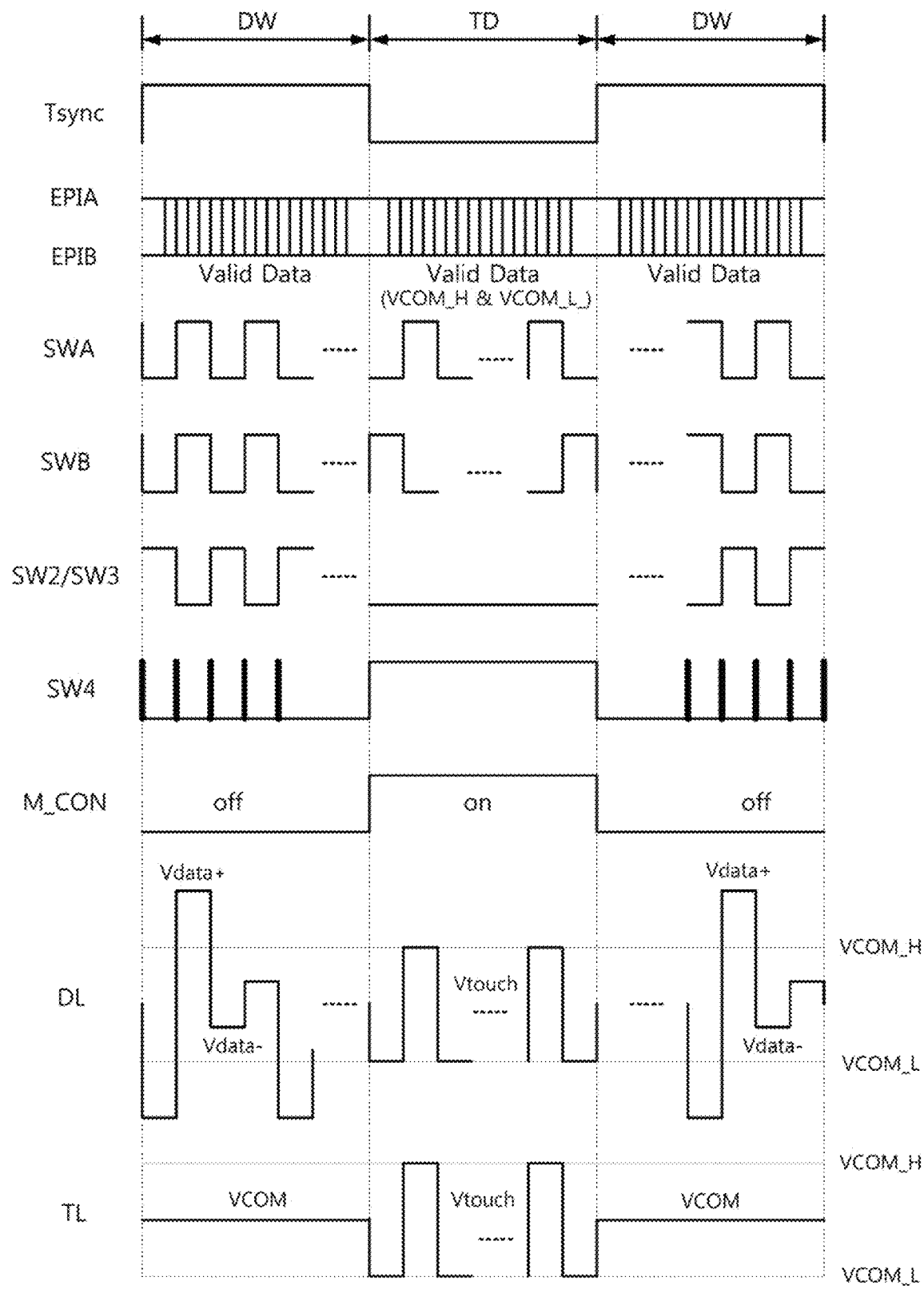
FIG. 5 is a driving waveform diagram of a touch/data driver according to embodiments of the present disclosure.

FIG. 4 is a circuit diagram of some components of the touch/data driver 400 in terms of an output according to embodiments of the present disclosure. FIG. 5 is a driving waveform diagram of the touch/data driver 400 according to embodiments of the present disclosure.

The touch/data driver 400 illustrated in FIG. 4 may include a digital/analog converter (hereinafter, DAC) 410, an output buffer 420, an output switching portion 430, and a multiplexer (MUX) 440. In addition, the touch/data driver 400 may further include a receiver, a shift register, a latch, a gradation voltage generator, a read out circuit, and so on, which are not illustrated.

The receiver may receive the EPI packet transmitted from the TCON 110 through the pair of transmission lines EPIA and EPIB, recover and output display information from the EPI packet during the data writing period DW, and recover and output the touch voltage data VCOM_H and VCOM_L from the EPI packet during the touch driving period TD. The shift register may sequentially output sampling signals while shifting a source start pulse according to source shift clock. The latch may latch image data according to the sampling signal and, simultaneously, output the latched image data to the DAC 410 during the data writing period DW. The latch may latch touch voltage data VCOM_H and VCOM_L according to the sampling signal and then, simultaneously output the latched touch voltage data VCOM_H and VCOM_L to the DAC 410 during the touch driving period TD. The touch voltage data VCOM_H and VCOM_L may be received by the DAC 410 from the receiver during the touch driving period TD. The gradation voltage generator may subdivide input reference gamma voltages into positive and negative gradation voltages corresponding to respective gradation values of the image data using a resistance string and then supply the subdivided gradation voltages to the DAC 410.

The DAC 410 may convert and output the supplied image data into positive and negative data voltages Vdata+ and Vdata− using gradation voltages during the data writing period DW. The DAC 410 may convert and output the supplied touch voltage data VCOM_H and VCOM_L into analog voltages, that is, the touch high voltage VCOM_H and the touch low voltage VCOM_L using gradation voltages during the touch driving period TD.

The output buffer 420 may include a plurality of positive output buffers P and a plurality of negative output buffers N, for buffering and outputting an output voltage supplied from the DAC 410 for each channel, and the positive output buffers P and the negative output buffers N may be alternately arranged. During the data writing period DW, the positive output buffer P may buffer and output the positive data voltage Vdata+ from the DAC 410 and the negative output buffer N may buffer and output the negative data voltage Vdata– from the DAC 410. During the touch driving period TD, the positive output buffers P may buffer and output the touch high voltage VCOM_H from the DAC 410 and the negative output buffers N may buffer and output the touch low voltage VCOM_L from the DAC 410.

The output switching portion 430 may include switches SWA, SWB, SW2, and SW3 for determining output channels CH of output voltages supplied from the output buffer 420, and switches SW4 connected between the output channels CH. The first A switches SWA may perform switching in response to a SWA control signal illustrated in FIG. 5, the first B switches SWB may perform switching in response to a SWB control signal illustrated in FIG. 5, the second and third switches SW2, SW3 may perform switching in response to a SW2/SW3 control signal illustrated in FIG. 5, and the fourth switches SW4 may perform switching in response to a SW4 control signal illustrated in FIG. 5.

The first A switch SWA may supply the output Vdata+ of an $N^{th}$ (N being a natural number) positive output buffer P to an $N^{th}$ output channel in response to the SWA control signal during the data writing period DW. The first B switches SWB may supply the output Vdata– of an $(N+1)^{th}$ negative output buffer N to an $(N+1)^{th}$ output channel during the data writing period DW. The first A switches SWA may supply the output VCOM_H of an $N^{th}$ positive output buffer P to an $N^{th}$ output channel in response to the SWA control signal during the touch driving period TD. The first B switches SWB may supply the output VCOM_L of an $(N+1)^{th}$ negative output buffers N to an $(N+1)^{th}$ output channel in response to the SWA control signal during the touch driving period TD.

The second switches SW2 may supply the output Vdata+ of the $N^{th}$ positive output buffer P to an $(N+1)^{th}$ output channel and supply the output Vdata– of the $(N+1)^{th}$ negative output buffer N to an $(N+2)^{th}$ output channel in response to a SW2 control signal during the data writing period DW. The third switches SW3 may supply the output Vdata+ of the $N^{th}$ positive output buffer P to an $(N-1)^{th}$ output channel and supply the output Vdata– of the $(N+1)^{th}$ negative output buffer N to an $N^{th}$ output channel in response to a SW3 control signal during the data writing period DW. The second switches SW2 and the third switches SW2 may be turned off in response to the SW2 and SW3 control signals during the touch driving period TD.

The fourth switches SW4 may circuit-short channels CH during a disable period in which the data voltages Vdata+ and Vdata– are not output in response to a SW4 control signal (source output enable signal) during the data writing period DW so as to charge-share positive and negative electric charges charged in the output channels CH, thereby reducing power consumption.

The fourth switches SW4 may short all the channels CH in response to the SW4 control signal during the touch driving period TD. In response to the SWA control signal and the SWB control signal having inverted phases during the touch driving period TD, the first A switches SWA and the first B switches may alternately output the output VCOM_H of the positive output buffers P and the output VCOM_L of the negative output buffer P in a time sequence, and the channels CH are shorted by the fourth switches SW4 and, thus, all the channels CH may output the touch driving signal Vtouch in which the touch high voltage VCOM_H and the touch low voltage VCOM_L are alternated, to the data lines DL.

The MUX 440 may select the common voltage Vcom and output the selected common voltage Vcom to a touch driving line TDL during the data writing period DW and may select the touch driving signal Vtouch supplied from any one of the output channels CH and output the touch driving signal Vtouch to a touch driving line TDL during the touch driving period TD, in response to a control signal M_CON supplied from the MCU 120. During the touch driving period TD, the touch driving line TDL may supply the touch driving signal Vtouch to the touch lines TL through respective switches S that are separately connected to the touch lines TL.

A read out circuit (not shown) may read-out and signal-process a signal fed back from each of the touch lines TL, convert the signal into touch sensing information, and supply the touch sensing information to the MCU 120.

As such, in the touch display device according to one or more embodiments of the present disclosure, the TCON 110 may transmit the voltage information VCOM_H and VCOM_L of the touch driving signal to the touch/data driver 400 through the data transmission lines EPIA and EPIB and the touch/data driver 400 may generate the touch driving signal Vtouch using the DAC 410, the output buffer 420, the output switching portion 430, and so on without a change and supply the touch driving signal Vtouch to the touch lines TL and the data lines DL of the panel 500 during the touch driving period TD. Accordingly, the TPIC 130 needs to generate only a gate off modulation voltage VGL_M, and to transmit the voltage to the gate driver 300 and, thus, a circuit structure of the TPIC 130 may be simplified and a transmission line between the TPIC 130 and the touch/data driver 400 may be omitted so as to reduce transmission patterns and a routing area of a PCB, thereby reducing EMI during the touch driving period TD.

Figure 6A:
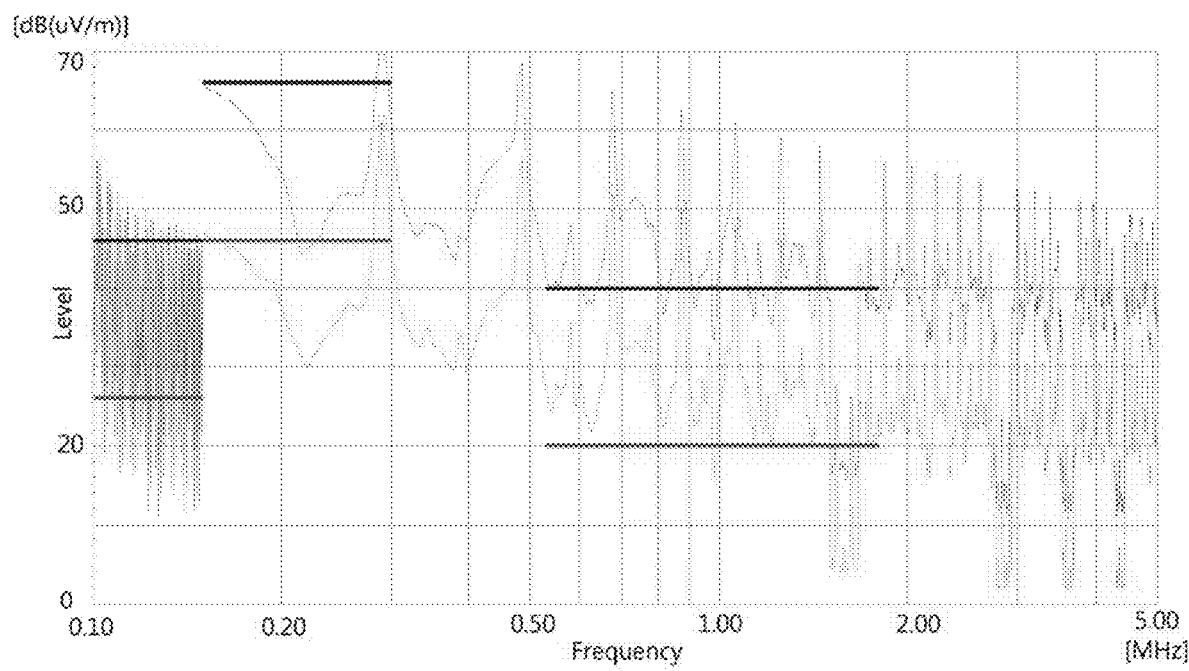
FIGS. 6A and 6B are graphs illustrating a comparison of an EMI level of a conventional touch display device and that of touch display device in accordance with one or more embodiments of the present disclosure.
Figure 6B:
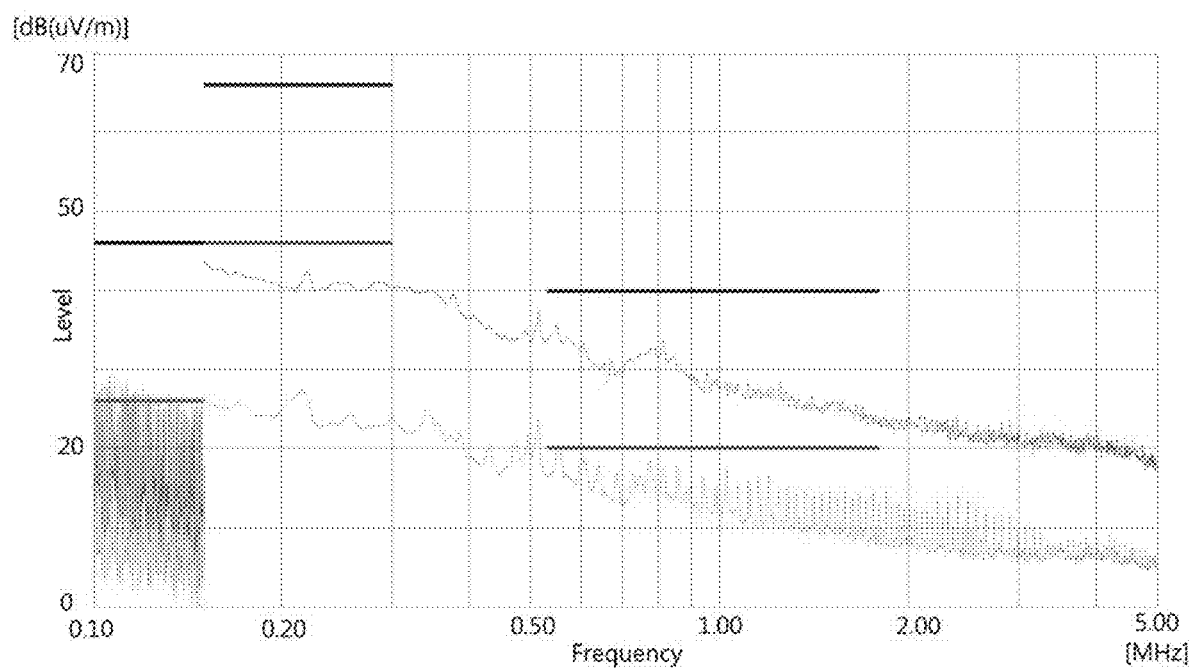

FIGS. 6A and 6B are graphs illustrating a comparison of an EMI level of a conventional touch display device and that of a display device in accordance with embodiments of the present disclosure.

As seen from FIG. 6A, a conventional touch display device has a problem in that a TPIC installed on a PCB generates the common voltage Vcom and the touch driving signal Vtouch (VCOM_H and VCOM_L) and supplies them to a touch/data driver for load-free driving during the touch driving period TD and, thus, EMI is increased due to a complex transmission pattern.

As seen from FIG. 6B, in a touch display device according to embodiments of the present disclosure, the TCON 110 transmits voltage information VCOM_H and VCOM_L of a touch driving signal to the touch/data driver 400 through the data transmission lines EPIA and EPIB and, thus, a transmission line between the TPIC 130 and the touch/data driver 400 may be omitted so as to simplify a transmission pattern of the PCB, thereby reducing EMI compared with the conventional touch display device of FIG. 6A during the touch driving period TD.

As described above, the touch display device and method of driving the same according to embodiments of the present disclosure may reduce costs by simplifying a TPIC and reduce a transmission patterns and a routing area of a PCB, thereby reducing costs and EMI.

In the touch display device and method of driving the same according to embodiments of the present disclosure, a timing controller may transmit voltage information of a touch driving signal to a touch/data driver through a data transmission line during a touch driving period so as to simplify a circuit structure of a touch power IC and to reduce a transmission patterns and a routing area of a PCB.

The touch display device and method of driving the same according to embodiments of the present disclosure may use an internal circuit structure of a touch/data driver, used in a data writing period, in a touch driving period without a change so as to generate a touch driving signal and to omit a touch driving signal generating block in a touch power IC, thereby simplifying a circuit structure of a touch power IC.

Accordingly, the touch display device and method of driving the same according to embodiments of the present disclosure may reduce costs by simplifying a TPIC and reduce a transmission patterns and a routing area of a PCB, thereby reducing costs and EMI.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A touch display device, comprising:
   a panel including a plurality of touch electrodes that are separately arranged in a display region;
   a touch and data driver configured to drive data lines and the touch electrodes of the panel and read out a capacitance change of the touch electrodes to output touch sensing information;
   a gate driver configured to drive gate lines of the panel; and
   a timing controller configured to supply display information to the touch and data driver through a data transmission line during a data writing period and supply touch voltage information including a plurality of touch voltage data to the touch and data driver through the data transmission line during a touch driving period,
   wherein the touch and data driver is configured to receive the touch voltage information including a plurality of touch voltage data, convert the plurality of touch voltage data to a plurality of touch voltages, generate a touch driving signal alternating the plurality of touch voltages, and supply the touch driving signal to the touch electrodes and the data lines during the touch driving period.

2. The touch display device according to claim 1, wherein the touch and data driver supplies a common voltage to the touch electrodes during the data writing period, and converts first and second touch voltage data into first and second touch voltages, switches the first and second of touch voltages alternately to generate the touch driving signal in which the first and second touch voltages are alternated, and supplies the touch driving signal to the data lines and the touch electrodes, during the touch driving period.

3. The touch display device according to claim 2, further comprising a touch power circuit that supplies a gate off voltage to the gate driver during the data writing period, and generates a gate off modulation voltage having a same phase and amplitude as the touch driving signal, and supplies the gate off modulation voltage to the gate driver, and the gate driver supplies the gate off modulation voltage to the gate lines during the touch driving period.

4. The touch display device according to claim 3, wherein the timing controller converts the display information into a first transmission packet embedded in a clock and supplies the first transmission packet to the touch and data driver through the data transmission line during the data writing period, and converts the touch voltage information into a second transmission packet embedded in the clock and supplies the second transmission packet to the touch and data driver through the data transmission line during the touch driving period, the data writing period and the touch driving period being indicated by a touch synchronization signal.

5. The touch display device according to claim 4, wherein the touch and data driver recovers the display information from the first transmission packet supplied from the timing controller and drives the data lines using the recovered display information during the data writing period, and recovers the touch voltage information from the second transmission packet supplied from the timing controller and drives the data lines and the touch electrodes using the recovered touch voltage information during the touch driving period.

6. The touch display device according to claim 5, wherein the touch and data driver comprises:
   a digital-to-analog converter for converting and outputting image data included in the display information into a data voltage during the data writing period and converting and outputting the first and second touch voltage data into the first and second touch voltages during the touch driving period;
   an output buffer for separately buffering and outputting respective output voltages of the digital-to-analog converter;
   an output switching stage including channel selection switches for selectively coupling respective output paths of the output buffer to respective channels that are coupled to respective data lines, and channel shorting switches coupled between respective pairs of the channels for selectively shorting the channels; and
   a multiplexer for selecting the common voltage and outputting the common voltage to the touch electrodes during the data writing period, and selecting the touch driving signal supplied from any one of the channels and outputting the touch driving signal to the touch electrodes during the touch driving period,
   wherein:
   first switches of the channel selection switches supply the first touch voltage from the output buffer to respective channels in a first period of the touch driving period, and second switches supply the second touch voltage from the output buffer to respective channels in a second period of the touch driving period, the first and second periods being alternately arranged in the touch driving period; and
   the channels are shorted by the shorting switches, output the touch driving signal in which the first touch voltage and the second touch voltage are alternated to the data lines, and output the touch driving signal to the touch electrode through the multiplexer, during the touch driving period.

7. A method of driving a touch display device, comprising:
supplying display information to a touch and data driver through a data transmission line during a data writing period indicated by a touch synchronization signal, by a timing controller;
supplying touch voltage information including a plurality of touch voltage data to the touch and data driver through the data transmission line during a touch driving period indicated by the touch synchronization signal, by the timing controller;
converting the display information into a data voltage, supplying the data voltage to data lines of a panel, and supplying a common voltage to touch electrodes of the panel during the data writing period, by the touch and data driver; and
converting the plurality of touch voltage data to a plurality of touch voltages, generating a touch driving signal alternating the plurality of touch voltages, and supplying the touch driving signal to the touch electrodes and data lines of the panel during the touch driving period, by the touch and data driver.

8. The method according to claim 7, further comprising:
scanning gate lines of the panel using a gate on voltage and a gate off voltage during the data writing period; and
supplying a gate off modulation voltage having a same phase and amplitude as the touch driving signal to the gate lines during the touch driving period.

9. The method according to claim 7, further comprising:
generating, by the timing controller, the touch synchronization signal indicating the data writing period and the touch driving period.

10. The method according to claim 7, further comprising:
generating, by a control unit, the touch synchronization signal indicating the data writing period and the touch driving period; and
supplying the touch synchronization signal to the timing controller.

11. The method according to claim 7, wherein the plurality of touch voltage data include first and second touch voltage data, and the plurality of touch voltages includes first and second touch voltages, and
wherein generating the touch driving signal alternating the plurality of touch voltages includes:
switching the first and second touch voltages alternately to output the first and second touch voltages.

12. The method according to claim 7, further comprising:
reading out, by the touch and data driver, a capacitance change of the touch electrodes during the touch driving period; and
outputting, by the touch and data driver, touch sensing information based on the capacitance change.

13. The method according to claim 7, wherein supplying the display information to the touch and data driver includes:
converting, by the timing controller, the display information into a first transmission packet embedded in a clock signal; and
supplying the first transmission packet to the touch and data driver through the data transmission line during the data writing period.

14. The method according to claim 13, wherein supplying the touch voltage information to the touch and data driver includes:

converting, by the timing controller, the touch voltage information into a second transmission packet embedded in the clock signal; and
supplying the second transmission packet to the touch and data driver through the data transmission line during the touch driving period.

15. The method according to claim 14, further comprising:
recovering, by the touch and data driver, the display information from the first transmission packet supplied from the timing controller; and
recovering, by the touch and data driver, the touch voltage information from the second transmission packet supplied from the timing controller.

16. A touch display device, comprising:
a panel including a plurality of touch electrodes, a plurality of data lines and a plurality of gate lines arranged in a display region of the touch display device;
a timing controller configured to output display information through a data transmission line during a data writing period, and output touch voltage information including a plurality of touch voltage data through the data transmission line during a touch driving period;
a touch and data driver coupled to the timing controller via the data transmission line, the touch and data driver being configured to:
receive the display information, convert the display information into one or more data voltages, supply the one or more data voltages to the data lines, and supply a common voltage to the touch electrodes during the data writing period, and
receive the touch voltage information including a plurality of touch voltage data, convert the plurality of touch voltage data to a plurality of touch voltages, generate a touch driving signal alternating the plurality of touch voltages, and supply the touch driving signal to the touch electrodes and the data lines during the touch driving period.

17. The touch display device according to claim 16, wherein the touch and data driver is configured to convert first and second touch voltage data into first and second touch voltages, and switches the first and second of touch voltages alternately to generate the touch driving signal by alternately outputting the first and second touch voltages during the touch driving period.

18. The touch display device according to claim 17, wherein the timing controller is configured to output the display information in a first transmission packet embedded in a clock signal during the data writing period, and output the touch voltage information in a second transmission packet embedded in the clock signal during the touch driving period.

19. The touch display device according to claim 18, wherein the touch and data driver is configured to recover the display information from the first transmission packet and drive the data lines using the recovered display information during the data writing period, and to recover the touch voltage information from the second transmission packet and drive the data lines and the touch electrodes using the recovered touch voltage information during the touch driving period.

20. The touch display device according to claim 16, wherein the touch and data driver is configured to detect a capacitance change of the touch electrodes during the touch driving period, and output touch sensing information based on the detected capacitance change.

* * * * *